US012803706B2

(12) United States Patent
Lu et al.

(10) Patent No.: US 12,803,706 B2
(45) Date of Patent: Nov. 17, 2026

(54) INFORMATION PROCESSING METHOD AND COMPUTER DEVICES

(71) Applicant: GUANGDONG OPPO MOBILE TELECOMMUNICATIONS CORP., LTD., Dongguan (CN)

(72) Inventors: Qianxi Lu, Dongguan (CN); Bingxue Leng, Dongguan (CN); Boyuan Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 294 days.

(21) Appl. No.: 18/609,557

(22) Filed: Mar. 19, 2024

(65) Prior Publication Data

US 2024/0223311 A1 Jul. 4, 2024

Related U.S. Application Data

(63) Continuation of application No. PCT/CN2021/123353, filed on Oct. 12, 2021.

(51) Int. Cl.
*H04W 88/04* (2009.01)
*H04L 1/00* (2006.01)

(52) U.S. Cl.
CPC .... *H04L 1/0072* (2013.01); *H04L 2001/0097* (2013.01); *H04W 88/04* (2013.01)

(58) Field of Classification Search
None
See application file for complete search history.

(56) References Cited

U.S. PATENT DOCUMENTS

2016/0338092 A1 11/2016 Agiwal
2017/0272553 A1 9/2017 Yi
2018/0076969 A1 3/2018 Yi
2019/0297641 A1 9/2019 Agiwal
2020/0146046 A1 5/2020 Agiwal
2021/0014730 A1 1/2021 Zheng
2021/0112584 A1 4/2021 Anil
2022/0038381 A1* 2/2022 Lohr ........................ H04L 47/34
2022/0174783 A1* 6/2022 Chen ........................ H04W 4/06
2022/0279609 A1* 9/2022 Wu ........................ H04W 76/14

FOREIGN PATENT DOCUMENTS

CN 101485134 B 6/2012
CN 102045242 B 8/2012
CN 109101217 A 12/2018
(Continued)

OTHER PUBLICATIONS

Supplementary European Search Report in the European application No. 21960195.2, mailed on Sep. 11, 2024. 9 pages.
(Continued)

*Primary Examiner* — Anh Vu H Ly
(74) *Attorney, Agent, or Firm* — BAYES PLLC

(57) ABSTRACT

An information processing method includes that: first information transmitted by a sending terminal is received, where the first information includes identification information in an adaptation layer protocol data unit (PDU); and whether to discard the adaptation layer PDU is determined based on the identification information. Computer devices are also provided.

9 Claims, 14 Drawing Sheets

(56) References Cited

FOREIGN PATENT DOCUMENTS

| | | | | |
|---|---|---|---|---|
| CN | 105227264 B | | 7/2019 | |
| CN | 110324860 A | | 10/2019 | |
| CN | 110769460 A | | 2/2020 | |
| CN | 111065074 A | | 4/2020 | |
| CN | 110572374 B | | 8/2020 | |
| CN | 111585938 A | | 8/2020 | |
| CN | 112042259 A | | 12/2020 | |
| CN | 112673674 A | | 4/2021 | |
| CN | 112783683 A | | 5/2021 | |
| CN | 109756468 B | | 8/2021 | |
| CN | 108353317 B | | 9/2021 | |
| CN | 113424635 A | | 9/2021 | |
| EP | 3429244 B1 | | 7/2021 | |
| WO | WO-2018059701 A1 | * | 4/2018 | ........ H04W 36/0072 |
| WO | 2020088583 A1 | | 5/2020 | |

OTHER PUBLICATIONS

OPPO: "Discussion on Identification of Remote UE and Traffic", 3GPP Draft; R2-167477_DISCUSSIONEONEREMOTEEU-EEANDEBEAR EREIDENTIFICATIONEV1, 3rd Generation Partnership Project (3GPP), Mobile Competence Centre; 650, Route Des Lucioles; F-06921 Sophia-Antipolis CED vol. RAN WG2, No. Reno, USA; Nov. 14, 2016-Nov. 18, 2016 Nov. 4, 2016 (Nov. 4, 2016), XP051192180, p. 2, paragraph 2.2-p. 3.

International Search Report in the international application No. PCT/CN2021/123353, mailed on Jun. 7, 2022. 5 pages with English translation.

Written Opinion of the International Search Authority in the international application No. PCT/CN2021/123353, mailed on Jun. 7, 2022. 6 pages with English translation.

3GPP TSG-RAN WG2 Meeting#109-e R2-2001339, Electronic meeting, Feb. 24-Mar. 6, 2020, Agenda item: 6.4.3.1, Source: Samsung, Title: Handling of error in MAC PDU for SL unicast, Document for: Discussion & Decision. Chapter 2-3. 2 pages.

3GPP TSG RAN Meeting #91e RP-210904, Electronic Meeting, Mar. 16-26, 2021, Source: Ericsson (Moderator), OPPO (rapporteur), Title: New WID on NR Sidelink Relay , Document for: Approval, Agenda Item: 9.1.2. the whole document. 5 pages.

* cited by examiner

INFORMATION PROCESSING METHOD AND COMPUTER DEVICES

CROSS-REFERENCE TO RELATED APPLICATION

This application is a continuation application of International Application No. PCT/CN2021/123353, entitled "INFORMATION PROCESSING METHOD AND APPARATUS, COMPUTER DEVICE, AND STORAGE MEDIUM", filed on Oct. 12, 2021. The content of this application is hereby incorporated by reference in its entirety.

TECHNICAL FIELD

The present disclosure relates to the technical field of communications, and in particular to a method for information processing, and computer devices.

BACKGROUND

In mobile communication technology, a media access control (MAC) protocol data unit (PDU) is at a MAC layer, and consists of strings arranged in bytes. The MAC PDU may consist of multiple MAC sub-PDUs.

At present, a mechanism for processing error data at MAC layer is usually to process a sub-PDU with an error based on a logical channel identifier (LCID) in a MAC PDU. For example, when an MAC entity receives a MAC PDU on a sidelink shared channel (SL-SCH) and the MAC PDU contains a reserved LCID value or an un-configured LCID value, the MAC entity discards the sub-PDU.

However, the above-mentioned mechanism for processing error data has the problem of inaccurate processing of MAC PDU.

SUMMARY

Based on this, in order to address the above technical problem, it is necessary to provide a method for information processing, and computer devices, so as to effectively improve an accuracy of processing error data.

In a first aspect, an embodiment of the disclosure provides an information processing method, which includes that:

- first information transmitted by a sending terminal is received, where the first information includes identification information in an adaptation layer PDU; and
- whether to discard the adaptation layer PDU is determined based on the identification information.

In a second aspect, an embodiment of the present disclosure provide a computer-readable storage medium having a computer program stored thereon, where when executed by a processor, the computer program implements the method described above in the first aspect.

In a third aspect, an embodiment of the present disclosure provide a computer-readable storage medium having a computer program stored thereon, where when executed by a processor, the computer program implements operations including:

- sending first information to a receiving terminal, where the first information includes identification information in an adaptation layer protocol data unit (PDU), the identification information being used for the receiving terminal to determine whether to discard the adaptation layer PDU.

DETAILED DESCRIPTION

In order to make the objective, technical solutions and advantages of the present disclosure more clearer, the present disclosure will be described in further detail in conjunction with the accompanying drawings and embodiments. It is to be understood that the specific embodiments described herein are intended to be explanatory only and are not intended to limit the present disclosure.

The device-to-device (D2D) communication mode in the existing sidelink transmission technology is different from that communication data are received or transmitted through the base station in the traditional cellular system. Because of its higher spectrum efficiency and lower transmission delay, it is widely used in various scenarios. For example, in the 3rd Generation Partnership Project (3GPP) technology, two transmission modes are defined, including: Mode A and Mode B (as illustrated in the schematic diagram of FIG. 1).

Figure 1:
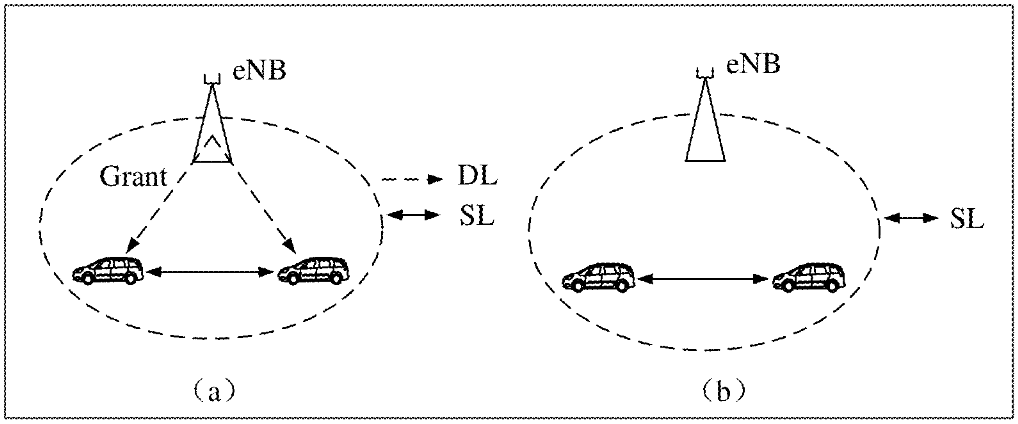
FIG. 1 is a schematic diagram of two transmission modes provided by an embodiment of the present disclosure.

Mode A (as illustrated in (a) of FIG. 1): the transmission resources of the terminal are allocated by the base station, and the terminal transmits data on the sidelink according to the resources allocated by the base station. The base station may allocate resources for single transmission or semi-static transmission for the terminal.

Mode B (as illustrated in (b) of FIG. 1): a vehicle terminal selects a resource in a resource pool for data transmission.

In 3GPP, the D2D communication mode is studied in different stages.

1. Proximity based service (ProSe): in Rel-12/13, the D2D communication is studied for the scenario of ProSe, which is mainly aimed at public security services. For example, in ProSe, UE may transmit/receive data discontinuously on sidelink by configuring the position of resource pool in time domain, thus achieving the effect of power saving.

2. In vehicle-to-everything (V2X), the power efficiency is not the main problem because of the continuous power supply of the vehicle-mounted system, while the data transmission delay is the main problem, so the terminal devices are required to transmit and receive continuously in terms of system design.

In addition, NR V2X is not limited to broadcast scenarios on the basis of LTE V2X, but further expands to unicast and multicast scenarios, and studies the application of V2X in these scenarios. For example, similar to LTE V2X, NR V2X will also define two resource authorization modes above: Mode A and Mode B (mode-1/2); furthermore, users may be in a mixed mode, that is, they may use mode-1 for resource acquisition and use mode-2 for resource acquisition at the same time. The resource acquisition is indicated through sidelink authorization, that is, the sidelink authorization indicates a time-frequency position of the corresponding resource. Different from LTE V2X, in addition to feedback-free, UE-initiated HARQ retransmission, NR V2X introduces feedback-based HARQ retransmission, which is not limited to unicast communication, but also includes multicast communication. Similar to LTE V2X, in NR V2X, the power efficiency is not the main problem because of the continuous power supply of the vehicle-mounted system, while data transmission delay is the main problem, so the terminal devices are required to transmit and receive continuously in terms of system design.

3. Wearable devices (FeD2D): In Rel-14, a scenario of wearable devices accessing the network through mobile phones is studied, which is mainly oriented to the scenario of low mobile speed and low power access. Moreover, in FeD2D, 3GPP concludes that the base station may configure DRX parameters of remote terminal through a relay terminal during the pre-research stage. However, there is no conclusion on the specific details of how to configure DRX due to this subject has not further entered into a standardization stage.

Based on the above discussions and applications, the requirements of continuous transmission and reception of terminal units are higher in the sidelink transmission technology, no matter what kind of application scenario.

However, in the existing medium access control (MAC) protocol of user terminal to network or user terminal to user terminal relay, performing error data processing is only to determine whether to discard the entire PDU data or sub-PDU data by determining the presence of a logical channel identifier (LCID) contained in protocol data unit (PDU) in the received MAC.

In an application, when an MAC entity receives an MAC PDU on an SL-SCH and the MAC PDU contains a reserved LCID value for unicast or multicast or an un-configured LCID value, for example, when a header and a payload are included in the MAC message and the payload contains three sub-PDUs, if one of the sub-PDUs includes the reserved LCID value or the un-configured LCID value, the sub-PDU is directly discarded as having error data in the MAC message.

In another application, when an MAC entity receives, on the SL-SCH, an MAC PDU containing a reserved LCID value for unicast, the MAC entity should discard sub-PDUs received in the MAC PDU or the entire PDU, for example, when a header and a payload are included in the MAC message and the payload contains three sub-PDUs, if one of the sub-PDUs includes an un-configured LCID value, the sub-PDU is discarded; or if one of the sub-PDUs includes the reserved LCID value, the entire PDU is discarded.

The above is a method for processing error data in the related art. The above method obviously does not process the error data about a source/destination ID in the MAC header, which easily leads to inaccurate data processing, further affects the continuity of receiving or transmitting data, and fails to meet the high requirements and high standards of continuous transmission and reception of terminal units in the sidelink transmission technology. In addition, a method for processing error data in the related art also does not take into account the error data in an adaptation layer (ADAPT) (on the Radio Link Control (RLC) layer and under the Packet Data Convergence Protocol (PDCP) layer), which leads to an increase in the probability of error data transmission applied to the adaptation layer (ADAPT), further affects the continuity of receiving or transmitting data, and fails to meet the high requirements and high standards of continuous transmission and reception of terminal devices in the sidelink transmission technology.

Based on the above problems, the present disclosure provides a method and an apparatus for information processing, a computer device, and a storage medium. On the one hand, the source/destination ID in a MAC header may be used for performing accurate error data processing to improve the continuity of data transmission, and on the other hand, the error data processing in an adaptation layer (ADAPT) may also be realized. The continuity of data transmission is improved while the applicability of the above method is also improved. The above method will be described in detail in the following embodiments.

Figure 2:
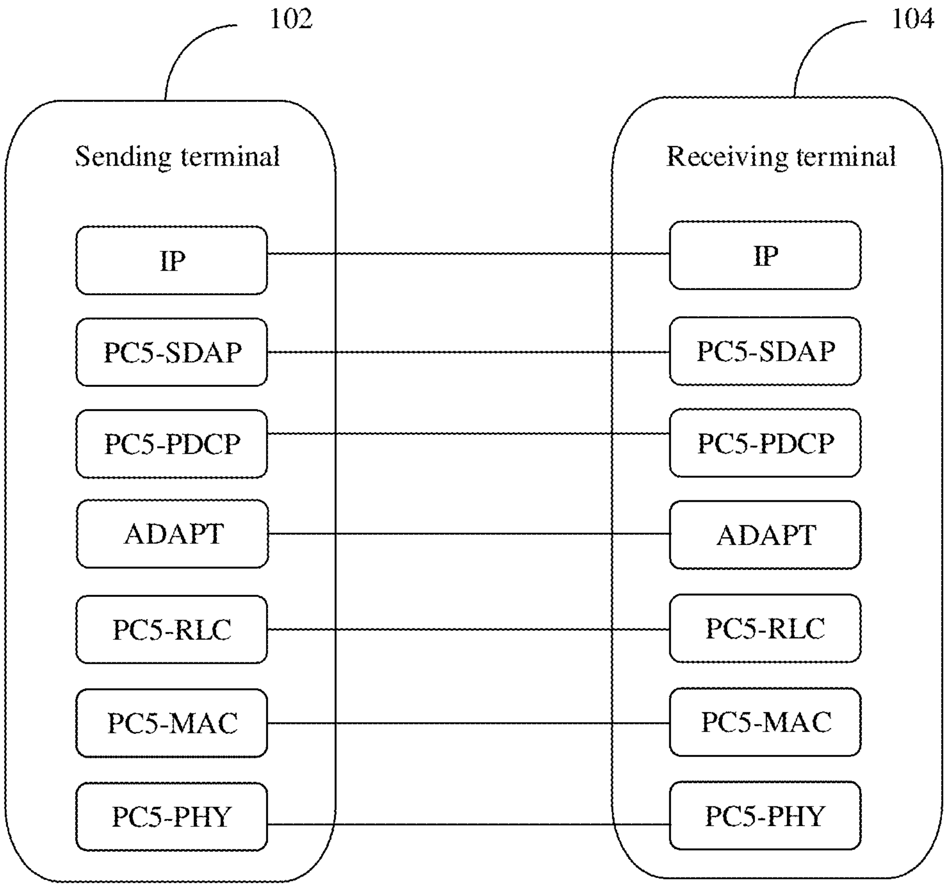
FIG. 2 is a schematic diagram of an application environment of an information processing method provided by an embodiment of the present disclosure.

The information processing method provided by the present disclosure may be applied to the application environment illustrated in FIG. 2. Herein, the sending terminal 102 and the receiving terminal 104 are connected by way of communication, and the data transmission between the sending terminal 102 and the receiving terminal 104 is based on a communication protocol including seven layers, such as the PC5-PHY layer, the PC5-MAC layer, the PC5-RLC layer, the ADAPT layer, the PC5-PDCP layer, the PC5-SDAP layer and the IP layer illustrated in FIG. 2. The sending terminal 102 or the receiving Terminal 104 may be but is not limited to a variety of personal computers, notebook computers, smart phones, tablets and portable wearable devices. The sending terminal 102 or the receiving terminal 104 may be a user terminal or a relay terminal in a communication network; the sending terminal 102 or the receiving terminal 104 may also be various vehicle-mounted terminals or relay terminals in the Vehicle-to-everything or the like.

Those skilled in the art will appreciate that the configuration illustrated in FIG. 2 is only a block diagram of a portion of the configuration relevant to the solution of the present disclosure and does not constitute a limitation to the application environment upon which the solution of the present disclosure is applied, the particular application environment may include more or fewer components than illustrated in the figure, or may combine certain components, or have different arrangements of components.

Figure 3:
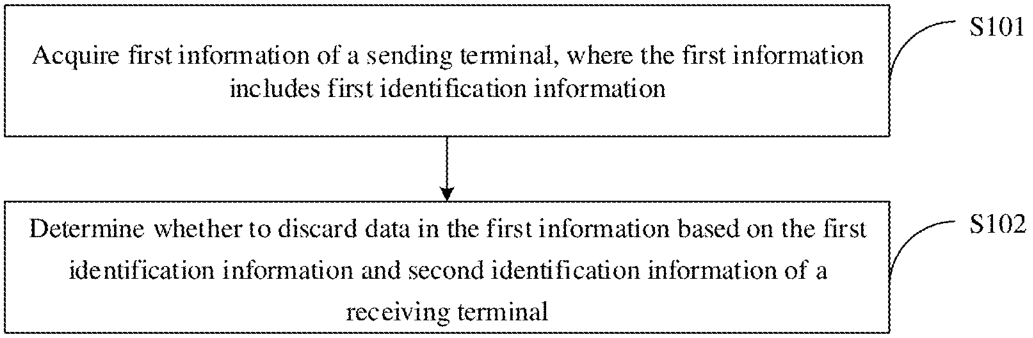
FIG. 3 is a schematic flowchart of an information processing method provided by an embodiment of the present disclosure.

In an embodiment, as illustrated in FIG. 3, an information processing method is provided, exemplified by its application to a receiving terminal in FIG. 2, the method includes the following operations as illustrated in FIG. 3.

At S101, first information of a sending terminal is acquired, herein the first information includes first identification information.

Figure 3A:
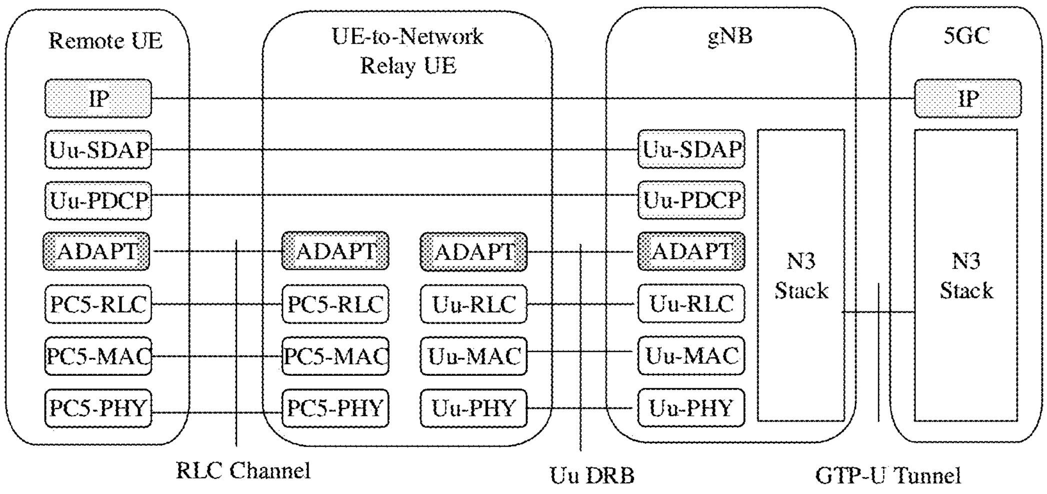
FIG. 3A is a schematic diagram of an application scenario of an information processing method provided by an embodiment of the present disclosure.
Figure 3B:
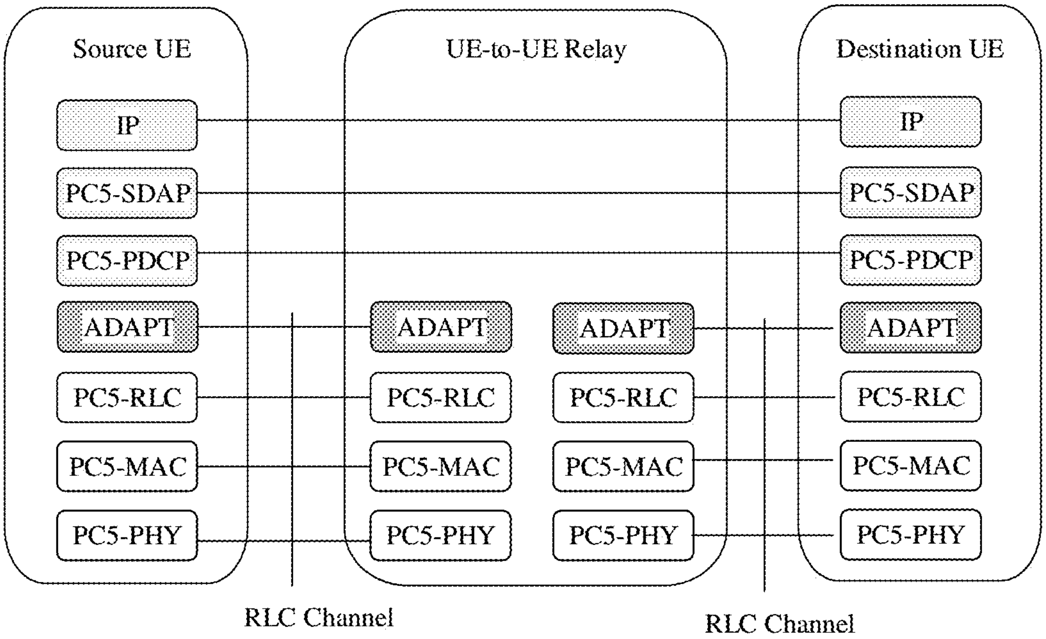
FIG. 3B is a schematic diagram of an application scenario of another information processing method provided by an embodiment of the present disclosure.

Herein, the sending terminal may be a remote UE, a relay UE or a network device in the application scenario of UE-to-network relay (the application scenario of UE-to-network relay as illustrated in FIG. 3A), or a source UE or a relay UE in the application scenario of UE-to-UE relay (the application scenario of UE-to-UE relay as illustrated in FIG. 3B). Alternatively, the first information may be a MAC message, the first identification information may include a destination field in the first information, which indicates the destination address of data transmitted by the sending terminal; the first identification information may also include a source address in the first information, which indicates the address of the sending terminal; or the first identification information may also include a device identifier of sending terminal, a device identifier of a receiving terminal, etc., which are not limited in embodiments of the present disclosure. Alternatively, the first identification information is carried in the MAC header and/or the MAC sub-PDUs of the first information, for example, the first identification information may include a destination ID/destination field in the MAC header or the like.

Figure 3C:
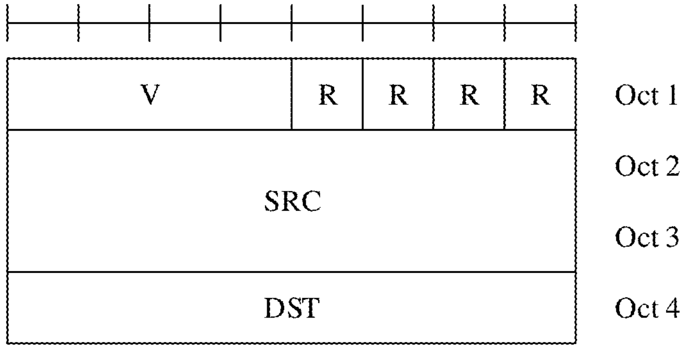
FIG. 3C is a schematic diagram of a MAC header provided by an embodiment of the present disclosure.

In this embodiment, the receiving terminal may be a terminal that receives the communication information transmitted by the sending device, and parses the first information from the communication information, or the receiving terminal may directly receive the first information from the sending terminal, and the receiving terminal may acquire the first identification information by parsing the first information. For example, when the MAC entity of the receiving terminal receives a MAC message on the SL-SCH, the receiving terminal may parse the MAC message to obtain first information in the MAC message, and then extract first identification information from the first information. For example, FIG. 3C provides a schematic diagram of a header of a MAC message, herein SRC information and/or DST information included in the MAC header are the first identification information. When a receiving terminal receives the MAC message including the header, the SRC information and/or DST information may be extracted from the header of the MAC message as the first identification information.

At S102, whether to discard data in the first information is determined based on the first identification information and second identification information of a receiving terminal.

Herein, the second identification information includes device identifiers (IDs), address IDs and the like configured for the receiving terminal. For example, the second identification information includes a source ID configured for the receiving terminal. The second identification information may also include a destination ID configured for the receiving terminal, and so on. Alternatively, the data in the first information includes PDU in the first information, or sub-PDUs in the first information. For example, the data in the first information includes MAC PDU or MAC sub-PDUs, that is, the data in the first information may be all or part of the data in the first information. For example, when the receiving terminal receives multiple sub-PDUs, the data in the first information may be all sub-PDUs, or one or more of the sub-PDUs.

In the embodiment, when the receiving terminal receives the data from the sending terminal, for example, when the MAC entity of the receiving terminal receives the MAC message on the SL-SCH, in a scenario, the receiving terminal may determine whether the destination field in the received MAC message matches the source ID of the receiving terminal itself. When the destination field in the received MAC message matches the source ID of the receiving terminal, it means that the receiving terminal may receive the data transmission from the sending terminal, and optionally, the receiving terminal may further determine whether to discard all or part of the data in the first information in combination with configuration or assignment of LCID in the received data. When the destination field in the received MAC message does not match the source ID of the receiving terminal, it means that the receiving terminal may not receive the data transmission from the sending terminal. In this case, the receiving terminal discards all the data in the first information directly. In another scenario, after determining whether the destination field in the received MAC message matches the source ID of the receiving terminal itself, when the destination field in the received MAC message matches the source ID of the receiving terminal itself, the receiving terminal further determines whether a source ID in the received MAC message matches a destination field of the receiving terminal. When the source ID in the received MAC message matches the destination field of the receiving terminal, it means that the receiving terminal can receive the data transmission from the sending terminal. In this case, the receiving terminal may further determine whether to discard all or part of the data in the first information in combination with the configuration or assignment of LCID in the received data. When the source ID in the received MAC message does not match the destination field of the receiving terminal, it means that the receiving terminal cannot receive the data transmission from the sending terminal, or the received data is wrong data. In this case, the receiving terminal does not receive data, or discards all the data in the first information directly. It should be noted that whether the destination field matches the source ID is determined by determining whether the destination field and the source ID are consistent, or determined by other means.

It should be noted that when the above-mentioned discard processing is executed, discarding the data in the first information may be refer to discarding the PDU in the first information specifically, for example, the entire PDU received is discarded; alternatively, one or more of sub-PDUs in the first information are discarded, for example, one of the received sub-PDUs is discarded and remaining of the received sub-PDUs are retained.

In addition, it should be noted that the embodiment of the present disclosure is described only as an example and is not limited to the present embodiment.

According to the information processing method provided in the above embodiment, first information including first identification information is obtained, and whether to discard data in the first information is determined based on the first identification information and second identification information of a receiving terminal. The method can process error information in combination with first identification information, where the first identification information may be header information in a MAC message. Therefore, the present disclosure provides a new method for processing error information based on MAC header information, and compared with a conventional method for processing error information only based on a LCID, an accuracy of error information processing is improved, thereby improving continuity and efficiency of receiving data by receiving terminal.

In the above operation illustrated in S102 of FIG. 3, optionally, the first identification information includes the destination field in the first information and the second identification information includes a source ID configured for the receiving terminal. Then, when the receiving terminal determines whether the destination field in the received first information matches the source ID of the receiving terminal, there is an application scenario, that is, the destination field in the first information does not match the source ID configured for the receiving terminal. For example, the receiving terminal is UE1, and the destination field in the first information does not match the source ID of UE1. In this case, the receiving terminal discards all the data in the first information directly, that is, the receiving terminal receives the data and discards the data, thus avoiding the error data reception caused by the mismatch between sending terminal and receiving terminal and improving the accuracy of receiving data by receiving terminal.

During determining whether the destination field in the first information matches the source ID, a method for determining a mismatch between the destination field and the source ID is provided. The method includes that: when the destination field in the first information does not match high data bits of the source ID configured for the receiving terminal, and/or when the destination field in the first information does not match low data bits of the source ID configured for the receiving terminal, it is determined that the destination field does not match the source ID.

The method of the embodiment is exemplified, for example, the total length of the destination ID is 24 bits, of which the lower 8 bits are in the physical control channel, and the higher 16 bits destination field are in the MAC header. Based on this, during determining whether the destination field matches the source ID, when the destination field is not match (e.g., inconsistent) with the lower 16 bits of the source ID, it is determined that the destination field does not match the source ID; alternatively, when the destination field is not match (e.g., inconsistent) with the higher 16 bits of the source ID, it is determined that the destination field does not match the source ID; alternatively, when the destination field does not match the lower 16 bits of the source ID, and the destination field does not match the higher 16 bits of the source ID, it is determined that the destination field does not match the source ID.

Figure 4:
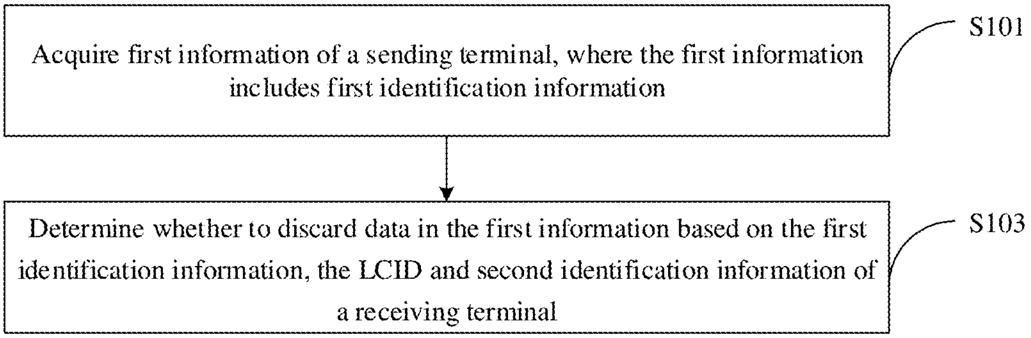
FIG. 4 is a schematic flowchart of an information processing method provided by an embodiment of the present disclosure.

In practical application, when the receiving terminal processes the received first information, the first information includes not only the first identification information, but also the logical channel identifier (LCID). Therefore, the receiving terminal may determine whether to discard the data in the first information based on the first identification information and the LCID included in the first information jointly. Based on this, in an embodiment, an implementation of the receiving terminal executes the operation S102 above is provided, as illustrated in FIG. 4. The implementation specifically includes the following operation.

At S103, whether to discard data in the first information is determined based on the first identification information, the LCID and second identification information of the receiving terminal.

Herein, the first identification information includes a destination field in the first information, and the second identification information includes a source ID configured for the receiving terminal.

When the operation S103 above is specifically executed, whether the destination field in the first information matches the source ID configured for the receiving terminal is determined firstly. Specifically, when the destination field in the first information matches the high data bits of the source ID configured for the receiving terminal, and/or when the destination field in the first information matches the low data bits of the source ID configured for the receiving terminal, it is determined that the destination field matches the source ID. For example, the total length of the destination ID is 24 bits, of which the lower 8 bits are in the physical control channel, and the higher 16 bits destination field is in the MAC header. Based on this, during determining whether the destination field matches the source ID, when the destination field is match (e.g., consistent) with the lower 16 bits of the source ID, it is determined that the destination field matches the source ID; alternatively, when the destination field is match (e.g., consistent) with the higher 16 bits of the source ID, it is determined that the destination field matches the source ID; alternatively, when the destination field matches the lower 16 bits of the source ID, and the destination field matches the higher 16 bits of the source ID, it is determined that the destination field matches the source ID.

In practical application, when the destination field in the first information matches the source ID configured for the receiving terminal, there are three methods to process information in application scenarios. The three information processing methods are explained below.

The first application scenario is that: when the destination field in the first information matches the source ID configured for the receiving terminal and the LCID is a specific LCID, the first information is received.

In this scenario, the LCID is a specific LCID, for example, the LCID is LCID-0 or LCID-1 for transmitting PC5-S. It indicates that the sending terminal wishes to establish a connection with the local receiving terminal, and the local receiving terminal also needs to support reception, that is, the LCID is a LCID negotiated between the sending terminal and the receiving terminal. Therefore, in this application scenario, the local receiving terminal (such as the local UE) performs the receiving operation of related data, that is, the receiving operation of the first information, and does not perform any operation of discarding data.

The second application scenario is that: when the destination field in the first information matches the source ID configured for the receiving terminal and the LCID is not a specific LCID, the data in the first information is discarded.

In this scenario, the LCID is an LCID other than a specific LCID, for example, the LCID is not LCID-0 or LCID-1 for transmitting PC5-S. It indicates that the received LCID is not an LCID negotiated between the sending terminal and the local receiving terminal previously, and the data received by the receiving terminal is error data. Therefore, in this application scenario, the local receiving terminal (such as the local UE) discards the data in the first information directly, for example, discards the PDU in the first information or discards sub-PDUs in the received first information, that is, discards the data while receiving the data.

The third application scenario is that: when the destination field in the first information matches the source ID configured for the receiving terminal and the LCID is not a configured LCID, the data in the first information is discarded.

In this scenario, the LCID is not a configured LCID, which indicates that the received LCID is not an LCID negotiated by the sending terminal and the local receiving terminal previously. For example, the sending terminal and the local receiving terminal have negotiated to configure LCID using 0-4 bits, but the received LCID is a LCID configured in 5-10 bits, at this time, the data received by the receiving terminal is error data. In this application scenario, the local receiving terminal (such as the local UE) discards the data in the first information directly, for example, discards the PDU in the first information or discards the sub-PDUs in the received first information, that is, discards the data while receiving the data.

Based on the first identification information and the second identification information in the embodiment as illustrated in FIG. 4, in an application, the first identification information may further include a source filed in the first information, and correspondingly, the second identification information further includes a destination ID configured for the receiving terminal. Thus, when the receiving terminal determines whether to discard the data in the first information based on the first identification information, the LCID and the second identification information jointly, that is, when the receiving terminal specifically executes the operation S103 above, it may specifically execute any one of the following methods.

The first method: when the source field in the first information does not match the destination ID configured for the receiving terminal and the destination field in the first information matches the source ID configured for the receiving terminal, the first information is received.

The source field in the first information does not match the destination ID configured for the receiving terminal and the destination field in the first information matches the source ID configured for the receiving terminal, which indicates that the data transmitted by the sending terminal is transmitted to the receiving terminal, and the receiving terminal needs to receive the data. Therefore, in this case, the receiving terminal receives the first information.

For example, assuming that the receiving terminal is a UE, when the source field in the first information received by the UE does not match the destination ID of the UE itself, and the destination field in the first information received by the UE matches the source ID of the UE itself, the UE receives the first information.

The second method: when the source field in the first information does not match the destination ID configured for the receiving terminal, the destination field in the first information matches the source ID configured for the receiving terminal, and the LCID is not a specific LCID, the data in the first information is discarded.

The source field in the first information does not match the destination ID configured for the receiving terminal and the destination field in the first information matches the source ID configured for the receiving terminal and the LCID is not a specific LCID, which indicates that the data transmitted by the sending terminal is transmitted to the receiving terminal, and the receiving terminal needs to receive the data, but the received data has error data and the error data needs to be processed. Therefore, in this case, the receiving terminal receives the first information but discards all or part of the data in the first information.

For example, assuming that the receiving terminal is a UE, the source field in the first information received by the UE does not match the destination ID of the UE itself, and the destination field in the first information received by the UE matches the source ID of the UE itself, and the LCID in the first identification information received by the UE is not LCID-0 or LCID-1 for transmitting PC5-S, the UE discards all or part of the data in the first information.

The third method: when the source field in the first information matches the destination ID configured for the receiving terminal, the destination field in the first information matches the source ID configured for the receiving terminal, and the LCID is not a configured LCID, the data in the first information is discarded.

The source field in the first information matches the destination ID configured for the receiving terminal, the destination field in the first information matches the source ID configured for the receiving terminal and the LCID is not a configured LCID, indicates that the sending terminal wishes to establish a connection with the receiving terminal, and the data transmitted by the sending terminal is transmitted to the receiving terminal, and the receiving terminal needs to receive the data, but the received data has error data and the error data needs to be processed. Therefore, in this case, the receiving terminal receives the first information but discards all or part of the data in the first information.

For example, assuming that the receiving terminal is a UE, the source field in the first information received by the UE matches the destination ID of the UE itself, the destination field in the first information received by the UE matches the source ID of the UE itself, and the LCID in the first identification information received by the UE is not a configured LCID, the UE discards all or part of the data in the first information.

It should be noted that the method for determining whether the source field in the first information matches the destination ID configured for the receiving terminal in S1031, S1032 and S1033 may refer to the aforementioned method for determining whether the destination field in the first information matches and the source ID configured for the receiving terminal. That is, when the source field in the first information matches the high data bits of the destination ID configured for the receiving terminal, and/or when the source field in the first information matches the low data bits of the destination ID configured for the receiving terminal, it is determined that the source field in the first information matches the destination ID configured for the receiving terminal, and the specific method may refer to the foregoing description and will not be described here.

Figure 5:
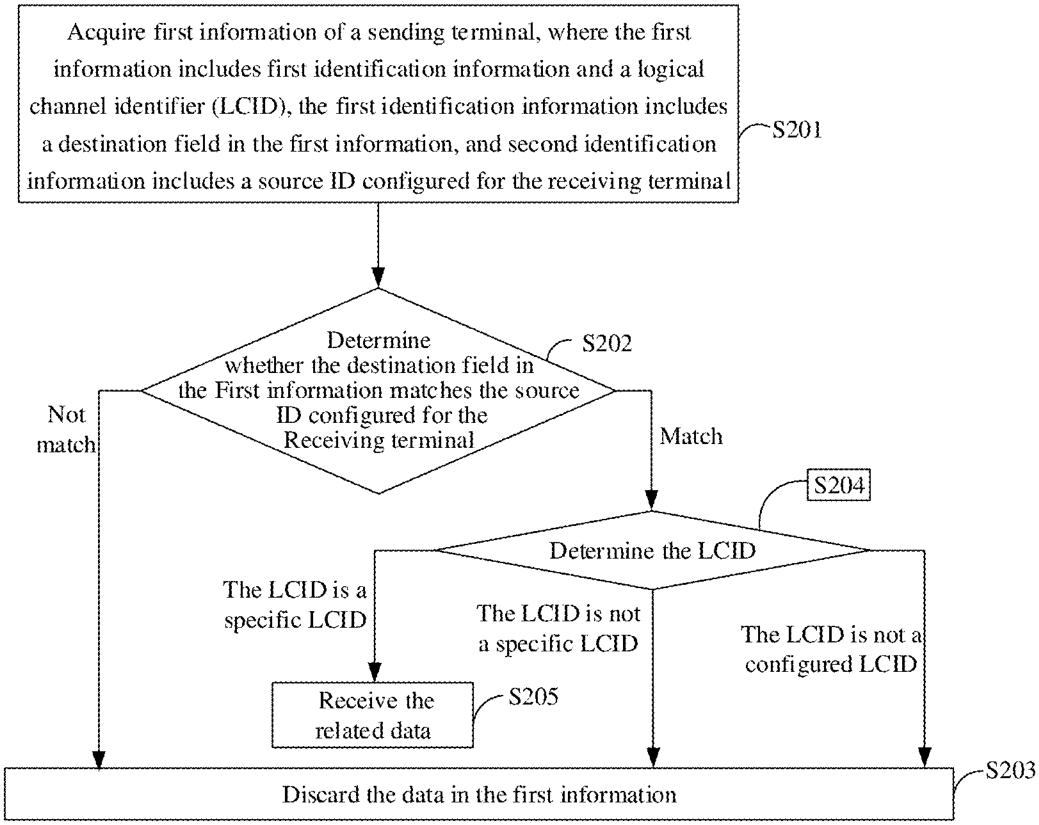
FIG. 5 is a schematic flowchart of an information processing method provided by an embodiment of the present disclosure.

Based on all of the above embodiments, an information processing method is also provided in the present disclosure. As illustrated in FIG. 5, the method includes the following operations.

At S201, first information of a sending terminal is acquired. The first information includes first identification information and a logical channel identifier (LCID), where the first identification information includes a destination field in the first information, and second identification information includes a source ID configured for the receiving terminal.

At S202, whether the destination field in the first information matches the source ID configured for the receiving terminal is determined. When the destination field in the first information does not match the source ID configured for the receiving terminal, the operation S203 is executed; otherwise, the operation S204 is executed.

At S203, the data in the first information is discarded.

At S204, the LCID is determined. When the LCID is a specific LCID, the operation S205 is executed; when the LCID is not a specific LCID, the operation S203 is executed; when the LCID is not a configured LCID, the operation S203 is executed.

At S205, the related data is received.

The above-mentioned operations are basically the same as the methods described in the foregoing embodiments, and the detailed contents may refer to the foregoing description and will not be described here.

Figure 6:
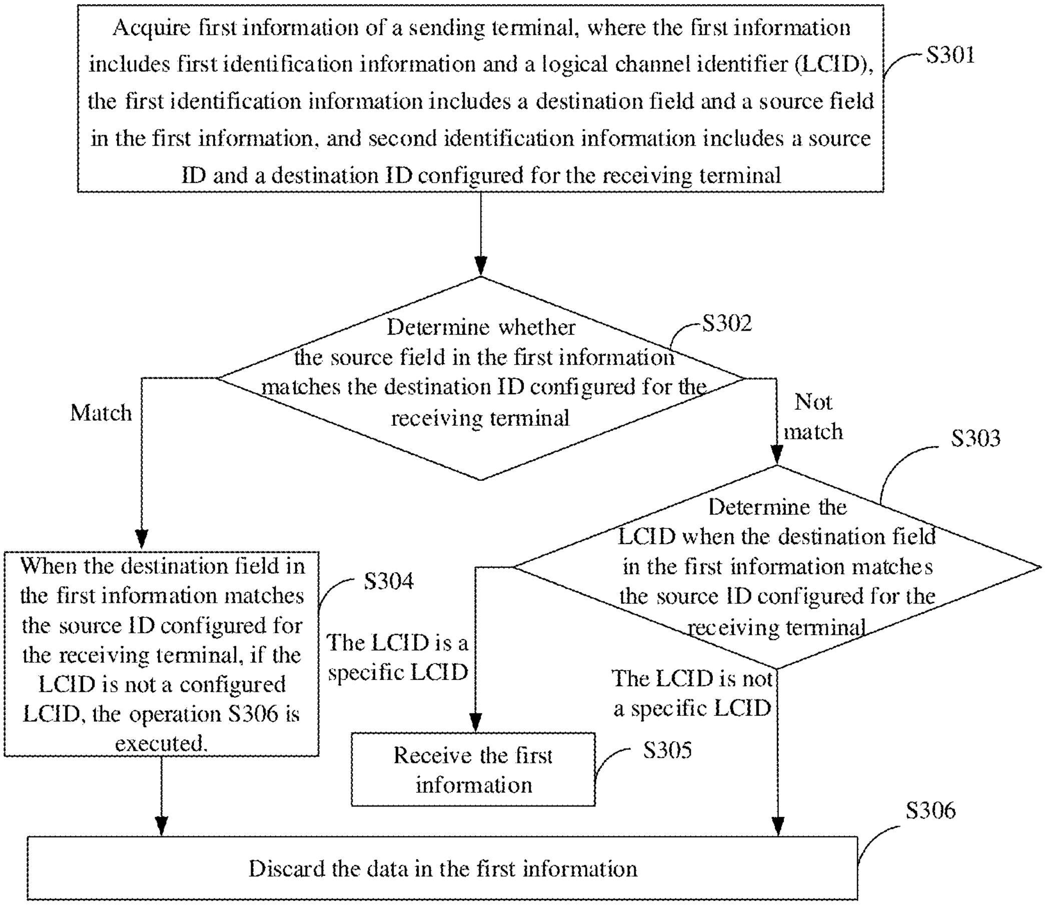
FIG. 6 is a schematic flowchart of an information processing method provided by an embodiment of the present disclosure.

Based on all of the above embodiments, another information processing method is also provided in the present disclosure. As illustrated in FIG. 6, the method includes the following operations.

At S301, first information of a sending terminal is acquired. Herein the first information includes first identification information and a logical channel identifier (LCID). The first identification information includes a destination field and a source field in the first information, and second identification information includes a source ID and a destination ID configured for the receiving terminal.

At S302, whether the source field in the first information matches the destination ID configured for the receiving terminal is determined. When the source field in the first information does not match the destination ID configured for the receiving terminal, the operation S303 is executed; otherwise, the operation S304 is executed.

At S303, when the destination field in the first information matches the source ID configured for the receiving terminal, the LCID is determined. When the LCID is a specific LCID, the operation S305 is executed; when the LCID is not a specific LCID, the operation S306 is executed.

At S304, when the destination field in the first information matches the source ID configured for the receiving terminal, if the LCID is not a configured LCID, the operation S306 is executed.

At S305, the first information is received.

At S306, the data in the first information is discarded.

The above-mentioned operations are basically the same as the methods described in the foregoing embodiments, and the detailed contents may refer to the foregoing description and will not be described here.

Figure 7:
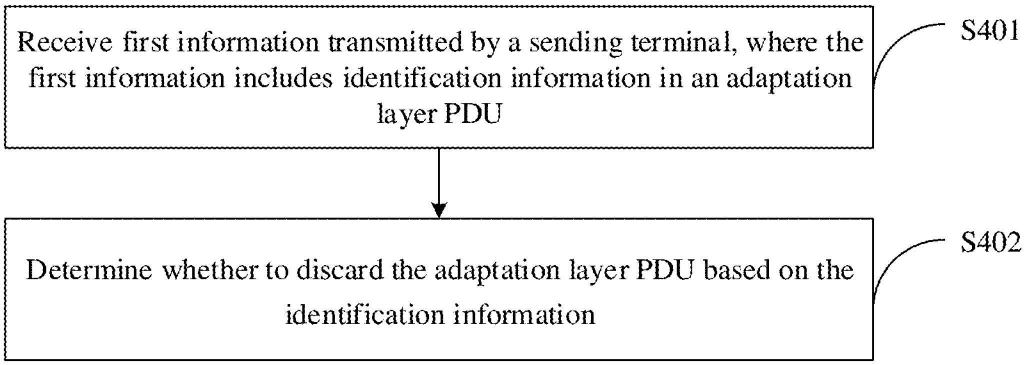
FIG. 7 is a schematic flowchart of an information processing method provided by an embodiment of the present disclosure.
Figure 8:
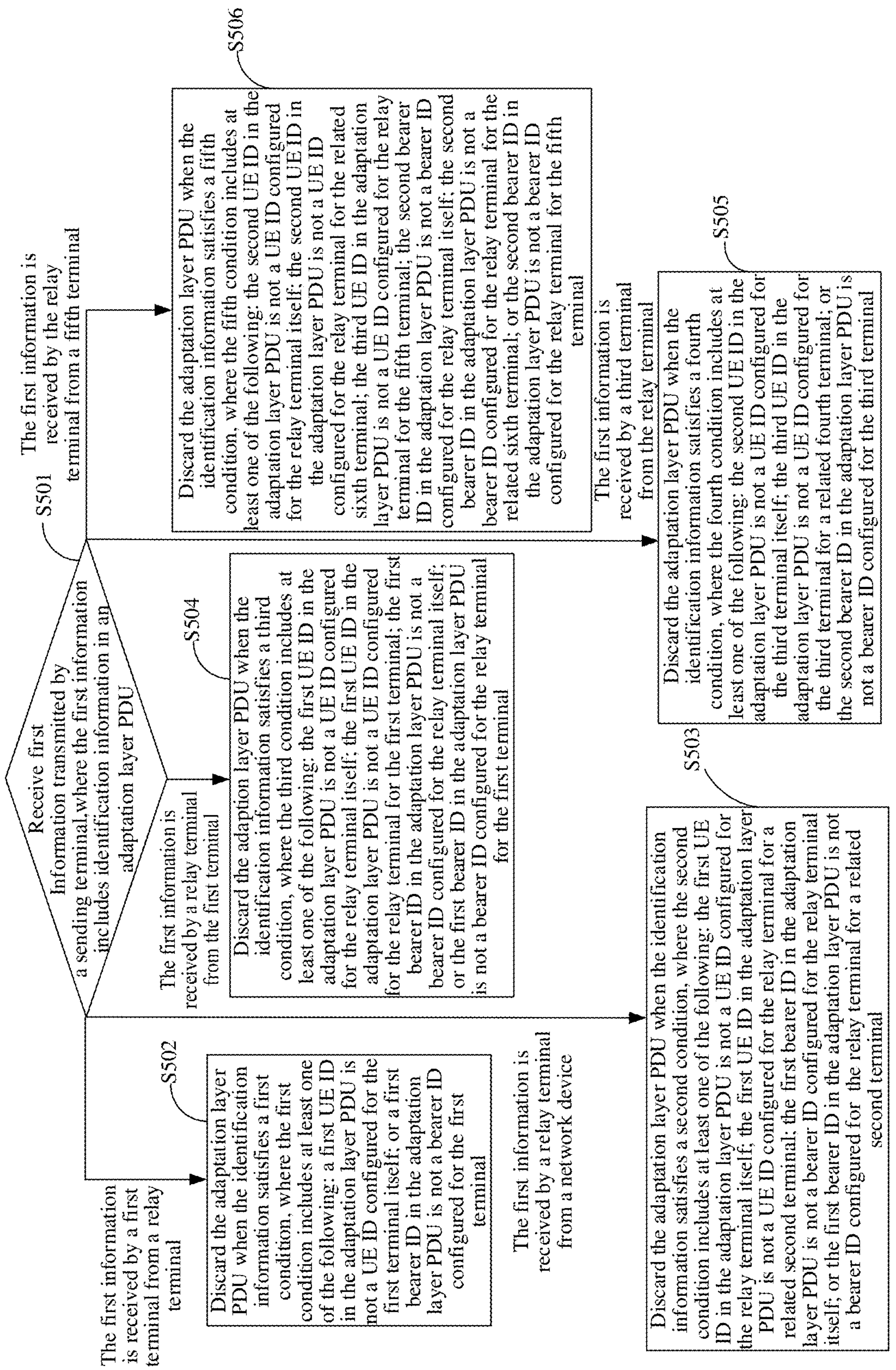
FIG. 8 is a schematic flowchart of an information processing method provided by an embodiment of the present disclosure.

The methods described in the embodiments of FIGS. 3-6 provide information processing methods applied in the MAC layer data transmission scenario, and the following embodiments of FIGS. 7-8 will provide information processing methods applied at the adaptation layer.

In an embodiment, as illustrated in FIG. 7, an information processing method is provided, which is described by applying the method to the receiving terminal in FIG. 3 as an example, the method includes the following operations.

At S401, first information transmitted by a sending terminal is received. Herein the first information includes identification information in an adaptation layer PDU.

Herein, the sending terminal may be a remote UE, a relay UE or a network device in the application scenario of UE-to-network relay (the application scenario of UE-to-network relay as illustrated in FIG. 3A), or a source UE or a relay UE in the application scenario of UE-to-UE relay (the application scenario of UE-to-UE relay as illustrated in FIG. 3B). Based on the above two application scenarios, the first information may be information received by the remote terminal (e.g., the Remote UE in FIG. 3A) from the relay terminal (e.g., the Relay UE in FIG. 3A). The first information may be information received by the relay terminal from a network device (e.g., a 5GC device in FIG. 3A). The first information may be information received by the relay terminal from the remote terminal. The first information may be information received by a destination terminal (e.g., a Destination UE in FIG. 3B) from a relay terminal (e.g., a UE-to-UE Relay UE in FIG. 3B). The first information may be information received by the relay terminal from the source terminal (e.g., the Source UE in FIG. 3B). The identification information includes a first UE ID and/or a first bearer ID in the adaptation layer PDU. Optionally, the identification information includes at least one of a second UE ID, a third UE ID or a second bearer ID in the adaptation layer PDU, herein the second UE ID corresponds to a destination ID and the third UE ID corresponds to a source ID.

At S402, whether to discard the adaptation layer PDU is determined based on the identification information.

Herein, the adaptation layer PDU may be the entire PDU at the adaptation layer or a sub-PDU at the adaptation layer.

In the embodiment, when the receiving terminal receives the data from the sending terminal, it may further determine whether the first information meets a preset discarding condition. When the preset discarding condition is satisfied, it means that the first information has error data and needs to be discarded, and the operation of discarding the adaptation layer PDU is executed; when the preset discarding condition is not satisfied, it means that there is no error data in the first information, and the receiving terminal does not need to discard the received first information.

It should be noted that when the above-mentioned discard processing is performed, the adaptation layer PDU is discarded. Specifically, the entire PDU received is discarded; alternatively, a sub-PDU at the adaptation layer is discarded, for example, one of the received sub-PDUs is discarded and remaining of the received sub-PDUs are retained.

The preset discarding condition may be determined according to the actual transmission application scenario. When the receiving terminal receives data transmitted by different sending terminals, the corresponding preset discarding conditions are also different. Several scenarios in which different receiving terminals receive data from different sending terminals are explained in the following.

For example, when applied in the transmission scenario illustrated in FIG. 3A:

Example 1: if the Remote UE in FIG. 3A receives first information transmitted by the Relay UE, the preset discarding condition may be determined according to one of the following: matching the first UE ID in the adaptation layer PDU included in the first information to the UE ID configured for the Remote UE; matching the first bearer ID in the adaptation layer PDU included in the first information to the bearer ID configured for the Remote UE; or successively matching the first UE ID in the adaptation layer PDU included in the first information to the UE ID configured for the Remote UE, and the first bearer ID in the adaptation layer PDU included in the first information to the bearer ID configured for the Remote UE.

Example 2: if the Relay UE in FIG. 3A receives the first information transmitted from the 5GC device, the preset discarding condition may be determined according to one of the following: matching the first UE ID in the adaptation layer PDU included in the first information to the UE ID configured for the Relay UE itself; matching the first bearer ID in the adaptation layer PDU included in the first information to the bearer ID configured for the Relay UE itself; or successively matching the first UE ID in the adaptation layer PDU included in the first information to the UE ID configured for the Relay UE itself, and the first bearer ID in the adaptation layer PDU included in the first information to the bearer ID configured for the Relay UE itself. Optionally, it may also be determined according to one of the following: matching the first UE ID in the adaptation layer PDU included in the first information to the UE ID configured for the Relay UE for the related Remote UE; or matching the first bearer ID in the adaptation layer PDU included in the first information to the bearer ID configured for the Relay UE for the related Remote UE.

Example 3: if the Relay UE in FIG. 3A receives the first information transmitted by Remote UE, the preset discarding condition may be determined according to one of the following: matching the first UE ID in the adaptation layer PDU included in the first information to the UE ID configured for the Relay UE itself; matching the first bearer ID in the adaptation layer PDU included in the first information to the bearer ID configured for the Relay UE itself; or successively matching the first UE ID in the adaptation layer PDU included in the first information to the UE ID configured for the Relay UE itself, and the first bearer ID in the adaptation layer PDU included in the first information to the bearer ID configured for the Relay UE itself. Optionally, it may also be determined according to one of the following: matching the first UE ID in the adaptation layer PDU included in the first information to the UE ID configured for the Relay UE for the Remote UE; matching the first bearer ID in the adaptation layer PDU included in the first information to the bearer ID configured for the Relay UE for the Remote UE; or successively matching the first UE ID in the adaptation layer PDU included in the first information to the UE ID configured for the Relay UE for the Remote UE, and the first bearer ID in the adaptation layer PDU included in the first information to the bearer ID configured for the Relay UE for the Remote UE.

For another example, when applied in the transmission scenario illustrated in FIG. 3B, the following examples are provided.

Example 4: if the Destination UE in FIG. 3B receives the first information transmitted from the UE-to-UE Relay UE, the preset discarding condition is determined according to one of the following: matching the second UE ID in the adaptation layer PDU to the UE ID configured for the Destination UE itself; matching the second UE ID in the adaptation layer PDU to the UE ID configured for the Destination UE for the related Source UE; or matching the second UE ID in the adaptation layer PDU to the bearer ID configured for the Destination UE.

Example 5: if the UE-to-UE Relay UE in FIG. 3B receives the first information transmitted from the Source UE, the preset discarding condition may be determined according to one of the following: matching the second UE ID in the adaptation layer PDU to the UE ID configured for the UE-to-UE Relay UE itself; matching the second UE ID in the adaptation layer PDU to the UE ID configured for the UE-to-UE Relay UE for the related Destination UE; matching the third UE ID in the adaptation layer PDU to the UE ID configured for the Source UE; matching the second bearer ID in the adaptation layer PDU to the bearer ID configured for the UE-to-UE Relay UE itself; matching the second bearer ID in the adaptation layer PDU to the bearer ID configured for the UE-to-UE Relay UE for the related Destination UE; or matching the second bearer ID in the adaptation layer PDU to the bearer ID configured for the UE-to-UE Relay UE for the Source UE.

The information processing method provided by the above embodiment includes that: first information including identification information in an adaptation layer PDU is received; and whether to discard the adaptation layer PDU is determined based on the identification information.

The method realizes a method for processing error information in the adaptation layer PDU transmission. Moreover, since the identification information includes the UE ID and/or the first bearer ID, that is, the processing of the error information in combination with the UE ID and/or the first bearer ID is realized, error information processing accuracy may be improved, thereby improving continuity and efficiency of receiving data by receiving terminal.

In the operation S402 of the embodiment illustrated in FIG. 7, when the first information is received by the first terminal from the relay terminal, an implementation for the receiving terminal to execute the S402 is provided. The implementation specifically includes that: if the identification information satisfies a first condition, the adaptation layer PDU is discarded. Herein, the first condition includes at least one of:

Item 1: the first UE ID in the adaptation layer PDU is not a UE ID configured for the first terminal for the first terminal itself; or Item 2: the first bearer ID in the adaptation layer PDU is not a bearer ID configured for the first terminal.

The first terminal is a remote terminal, such as the Remote UE in FIG. 3A.

In the embodiment, when the first terminal receives the first information from the relay terminal, the first terminal determines whether the first UE ID in the adaptation layer PDU included in the first information is consistent with the UE ID configured for the first terminal for the first terminal itself; if the two are inconsistent, the adaptation layer PDU is discarded; otherwise, if the two are consistent, the adaptation layer PDU will not be discarded. Optionally, the first terminal may also determine whether the first bearer ID in the adaptation layer PDU is consistent with the bearer ID configured for the first terminal; if the two are inconsistent, the adaptation layer PDU is discarded; otherwise, if the two are consistent, the adaptation layer PDU will not be discarded. Optionally, the first terminal may firstly determine whether the first UE ID in the adaptation layer PDU included in the first information is consistent with the UE ID configured for the first terminal for the first terminal itself; if the two are consistent, then the first terminal further determines whether the first bearer ID in the adaptation layer PDU is consistent with the bearer ID configured for the first terminal; if the first bearer ID in the adaptation layer PDU is inconsistent with the bearer ID configured for the first terminal, the adaptation layer PDU is discarded; otherwise, if the two are consistent, the adaptation layer PDU will not be discarded. Optionally, the first terminal may firstly determine whether the first bearer ID in the adaptation layer PDU is consistent with the bearer ID configured for the first terminal; if the two are consistent, then the first terminal further determines whether the first UE ID in the adaptation layer PDU included in the first information is consistent with the UE ID configured for the first terminal for the first terminal itself; if the two are inconsistent, the adaptation layer PDU is discarded; otherwise, if the two are consistent, the adaptation layer PDU will not be discarded. The above method may be referred in the illustration of the foregoing Example 1, and will not be described here.

In the operation S402 described in the embodiment of FIG. 7, when the first information is received by the relay terminal from the network device, an implementation for the receiving terminal to execute the S402 is provided. The implementation specifically includes that: if the identification information satisfies a second condition, the adaptation layer PDU is discarded. Herein, the second condition includes at least one of:

Item 1: the first UE ID in the adaptation layer PDU is not a UE ID configured for the relay terminal for the relay terminal itself;

Item 2: the first UE ID of the adaptation layer PDU is not a UE ID configured for the relay terminal for the related second terminal;

Item 3: the first bearer ID of the adaptation layer PDU is not a bearer ID configured for the relay terminal for the relay terminal itself; or Item 4: the first bearer ID of the adaptation layer PDU is not a bearer ID configured for the relay terminal for the related second terminal.

The relay terminal may be a Remote UE in FIG. 3A. The related second terminal is a remote terminal related with a relay terminal, such as multiple Remote UEs connected to the Relay UE in FIG. 3A.

In the embodiment, when the relay terminal receives the first information from the network device, the relay terminal determines whether the first UE ID in the adaptation layer PDU included in the first information is consistent with the UE ID configured for the relay terminal for the relay terminal; if the two are inconsistent, the adaptation layer PDU is discarded; otherwise, if the two are consistent, the adaptation layer PDU will not be discarded. Optionally, the relay terminal may also determine whether the first UE ID in the adaptation layer PDU is consistent with the UE ID configured for the relay terminal for the related second terminal (multiple remote terminals, for example, multiple Remote UEs in FIG. 3A); if the two are inconsistent, the adaptation layer PDU is discarded; otherwise, if the two are consistent, the adaptation layer PDU will not be discarded. Optionally, the relay terminal may also determine whether the first bearer ID in the adaptation layer PDU included in the first information is consistent with the bearer ID configured for the relay terminal for the relay terminal; if the two are inconsistent, the adaptation layer PDU is discarded; otherwise, if the two are consistent, the adaptation layer PDU will not be discarded. Optionally, the relay terminal can also determine whether the first bearer ID in the adaptation layer PDU included in the first information is consistent with the bearer ID configured for the relay terminal for the related second terminal; if the two are inconsistent, the adaptation layer PDU is discarded; otherwise, if the two are consistent, the adaptation layer PDU will not be discarded. Optionally, the relay terminal may firstly determine whether the first UE ID in the adaptation layer PDU included in the first information is consistent with the UE ID configured for the relay terminal for the relay terminal; if the two are consistent, then the relay terminal further determines whether the first bearer ID in the adaptation layer PDU included in the first information is consistent with the bearer ID configured for the relay terminal for the relay terminal; if the two are inconsistent, the adaptation layer PDU is discarded; otherwise, if the two are consistent, the adaptation layer PDU will not be discarded. Optionally, the relay terminal may firstly determine whether the first UE ID in the adaptation layer PDU included in the first information is consistent with the UE ID configured for the relay terminal for the related second terminal; if the two are consistent, then the relay terminal further determines whether the first bearer ID in the adaptation layer PDU included in the first information is consistent with the bearer ID configured for the relay terminal for the related second terminal; if the two are inconsistent, the adaptation layer PDU is discarded; otherwise, if the two are consistent, the adaptation layer PDU will not be discarded. The above method may be referred in the illustration of the foregoing Example 2, and will not be described here.

In the operation S402 described in the embodiment of FIG. 7, when the first information is received by the relay terminal from the first terminal, an implementation for the receiving terminal to execute the S402 is provided. The implementation specifically includes that: if the identification information satisfies a third condition, the adaptation layer PDU is discarded. Herein, the third condition includes at least one of:

Item 1: the first UE ID in the adaptation layer PDU is not a UE ID configured for the relay terminal for the relay terminal itself;

Item 2: the first UE ID in the adaptation layer PDU is not a UE ID configured for the relay terminal for the first terminal;

Item 3: the first bearer ID in the adaptation layer PDU is not a bearer ID configured for the relay terminal for the relay terminal itself; or Item 4: the first bearer ID in the adaptation layer PDU is not a bearer ID configured for the relay terminal for the first terminal.

In the embodiment, when the relay terminal receives the first information from the first terminal, the relay terminal determines whether the first UE ID in the adaptation layer PDU included in the first information is consistent with the UE ID configured for the relay terminal for the relay terminal itself; if the two are inconsistent, the adaptation layer PDU is discarded; otherwise, if the two are consistent, the adaptation layer PDU will not be discarded. Optionally, the relay terminal may also determine whether the first UE ID in the adaptation layer PDU included in the first information is consistent with the UE ID configured for the relay terminal for the first terminal (for example, Remote UE in FIG. 3A); if the two are inconsistent, the adaptation layer PDU is discarded; otherwise, if the two are consistent, the adaptation layer PDU will not be discarded. Optionally, the relay terminal may also determine whether the first bearer ID in the adaptation layer PDU included in the first information is consistent with the bearer ID configured for the relay terminal for the relay terminal itself; if the two are inconsistent, the adaptation layer PDU is discarded; otherwise, if the two are consistent, the adaptation layer PDU will not be discarded. Optionally, the relay terminal may also determine whether the first bearer ID in the adaptation layer PDU included in the first information is consistent with the bearer ID configured for the relay terminal for the first terminal; if the two are inconsistent, the adaptation layer PDU is discarded; otherwise, if the two are consistent, the adaptation layer PDU will not be discarded. Optionally, the relay terminal may firstly determine whether the first UE ID in the adaptation layer PDU included in the first information is consistent with the UE ID configured for the relay terminal for the relay terminal itself; if the two are consistent, then the relay terminal further determines whether the first bearer ID in the adaptation layer PDU included in the first information is consistent with the bearer ID configured for the relay terminal for the relay terminal; if the first bearer ID in the adaptation layer PDU included in the first information is inconsistent with the bearer ID configured for the relay terminal for the relay terminal, the adaptation layer PDU is discarded; otherwise, if the two are consistent, the adaptation layer PDU will not be discarded. Optionally, the relay terminal may firstly determine whether the first UE ID in the adaptation layer PDU included in the first information is consistent with the UE ID configured for the relay terminal for the first terminal; if the two are consistent, then the relay terminal further determines whether the first bearer ID in the adaptation layer PDU included in the first information is consistent with the bearer ID configured for the relay terminal for the first terminal; if the two are inconsistent, the adaptation layer PDU is discarded; otherwise, if the two are consistent, the adaptation layer PDU will not be discarded. The above method may be referred in the illustration of the foregoing Example 3, and will not be described here.

In the operation S402 described in the embodiment of FIG. 7, when the identification information includes at least one of a second UE ID, a third UE ID, or a second bearer ID in the adaptation layer PDU, and the first information is received by a third terminal from a relay terminal, an implementation for the receiving terminal to execute the S402 is provided. The implementation specifically includes that: if the identification information satisfies a fourth condition, the adaptation layer PDU is discarded. Herein, the fourth condition includes at least one of:

Item 1: the second UE ID in the adaptation layer PDU is not a UE ID configured for the third terminal itself;

Item 2: the third UE ID of the adaptation layer PDU is not a UE ID configured for the third terminal for a related fourth terminal; or Item 3: the second bearer ID in the adaptation layer PDU is not a bearer ID configured for the third terminal.

The second UE ID corresponds to a Destination ID in the PDU, the third UE ID corresponds to a Source ID in the PDU, and the third terminal is a destination terminal, for example, the Destination UE in FIG. 3B. The related fourth terminals are multiple source terminals related with the relay terminal, such as multiple Source UEs connected to the Relay UE in FIG. 3B.

In the embodiment, when the third terminal receives the first information from the relay terminal, the third terminal determines whether the second UE ID in the adaptation layer PDU included in the first information is consistent with the UE ID configured for the third terminal itself; if the two are inconsistent, the adaptation layer PDU is discarded; otherwise, if the two are consistent, the adaptation layer PDU will not be discarded. Optionally, the first terminal may also determine whether the third UE ID in the adaptation layer PDU included in the first information is consistent with the UE ID configured for the third terminal for the fourth terminal; if the two are inconsistent, the adaptation layer PDU is discarded; otherwise, if the two are consistent, the adaptation layer PDU will not be discarded. Optionally, the first terminal may also determine whether the second bearer ID in the adaptation layer PDU included in the first information is consistent with the bearer ID configured for the third terminal; if the two are inconsistent, the adaptation layer PDU is discarded; otherwise, if the two are consistent, the adaptation layer PDU will not be discarded.

Optionally, the third terminal may firstly determine whether the second UE ID in the adaptation layer PDU included in the first information is consistent with the UE ID configured for the third terminal for the third terminal itself; if the two are consistent, then the third terminal further determines whether the second bearer ID in the adaptation layer PDU included in the first information is consistent with the bearer ID configured for the relay terminal for the relay terminal itself; if the two are inconsistent, the adaptation layer PDU is discarded; otherwise, if the two are consistent, the adaptation layer PDU will not be discarded. Optionally, the third terminal may firstly determine whether the third UE ID in the adaptation layer PDU included in the first information is consistent with the UE ID configured for the relay terminal for the related fourth terminal; if the two are consistent, then the third terminal further determines whether the second bearer ID in the adaptation layer PDU included in the first information is consistent with the bearer ID configured for the third terminal; if the two are inconsistent, the adaptation layer PDU is discarded; otherwise, if the two are consistent, the adaptation layer PDU will not be discarded. The above method may be referred in the illustration of the foregoing Example 4, and will not be described here.

In the operation S402 described in the embodiment of FIG. 7, when the first information is received by the relay terminal from a fifth terminal, an implementation for the receiving terminal to execute the S402 is provided. The implementation specifically includes that: if the identification information satisfies a fifth condition, the adaptation layer PDU is discarded. Herein, the fifth condition includes at least one of:

Item 1: the second UE ID in the adaptation layer PDU is not a UE ID configured for the relay terminal for the relay terminal itself;

Item 2: the second UE ID in the adaptation layer PDU is not a UE ID configured for the relay terminal for the related sixth terminal;

Item 3: the third UE ID in the adaptation layer PDU is not a UE ID configured for the relay terminal for the fifth terminal;

Item 4: the second bearer ID in the adaptation layer PDU is not a bearer ID configured for the relay terminal for the relay terminal itself;

Item 5: the second bearer ID in the adaptation layer PDU is not a bearer ID configured for the relay terminal for the related sixth terminal; or Item 6: the second bearer ID in the adaptation layer PDU is not a bearer ID configured for the relay terminal for the fifth terminal.

The fifth terminal is a source terminal, such as the Source UE in FIG. 3B. Related sixth terminals are multiple destination terminals related with the relay terminal, such as multiple Destination UEs connected to the Relay UE in FIG. 3B.

In the embodiment, when the relay terminal receives the first information from the fifth terminal, the relay terminal determines whether the second UE ID in the adaptation layer PDU included in the first information is consistent with the UE ID configured for the relay terminal for the relay terminal itself; if the two are inconsistent, the adaptation layer PDU is discarded; otherwise, if the two are consistent, the adaptation layer PDU will not be discarded. Optionally, the relay terminal may also determine whether the second UE ID in the adaptation layer PDU included in the first information is consistent with the UE ID configured for the relay terminal for the related sixth terminal; if the two are inconsistent, the adaptation layer PDU is discarded; otherwise, if the two are consistent, the adaptation layer PDU will not be discarded. Optionally, the relay terminal may also determine whether the third UE ID in the adaptation layer PDU included in the first information is consistent with the UE ID configured for the relay terminal for the fifth terminal; if the two are inconsistent, the adaptation layer PDU is discarded; otherwise, if the two are consistent, the adaptation layer PDU will not be discarded. Optionally, the relay terminal may also determine whether the second bearer ID in the adaptation layer PDU included in the first information is consistent with the bearer ID configured for the relay terminal; if the two are inconsistent, the adaptation layer PDU is discarded; otherwise, if the two are consistent, the adaptation layer PDU will not be discarded. Optionally, the relay terminal may also determine whether the second bearer ID in the adaptation layer PDU included in the first information is consistent with the bearer ID configured for the relay terminal for the related sixth terminal; if the two are inconsistent, the adaptation layer PDU is discarded; otherwise, if the two are consistent, the adaptation layer PDU will not be discarded. Optionally, the relay terminal may also determine whether the second bearer ID in the adaptation layer PDU included in the first information is consistent with the bearer ID configured for the relay terminal for the fifth terminal; if the two are inconsistent, the adaptation layer PDU is discarded; otherwise, if the two are consistent, the adaptation layer PDU will not be discarded.

Optionally, the relay terminal may firstly determine whether the second UE ID in the adaptation layer PDU included in the first information is consistent with the UE ID configured for the relay terminal for the relay terminal itself; if the two are consistent, then the relay terminal further determines whether the second bearer ID in the adaptation layer PDU included in the first information is consistent with the bearer ID configured for the relay terminal; if the two are inconsistent, the adaptation layer PDU is discarded; otherwise, if the two are consistent, the adaptation layer PDU will not be discarded. Optionally, the relay terminal may firstly determine whether the second UE ID in the adaptation layer PDU included in the first information is consistent with the UE ID configured for the relay terminal for the related sixth terminal; if the two are consistent, then the relay terminal further determines whether the second bearer ID in the adaptation layer PDU included in the first information is consistent with the bearer ID configured for the relay terminal for the related sixth terminal; if the two are inconsistent, the adaptation layer PDU is discarded; otherwise, if the two are consistent, the adaptation layer PDU will not be discarded. Optionally, the relay terminal may firstly determine whether the third UE ID in the adaptation layer PDU included in the first information is consistent with the UE ID configured for the relay terminal for the fifth terminal; if the two are consistent, then relay terminal further determines whether the second bearer ID in the adaptation layer PDU included in the first information is consistent with the bearer ID configured for the relay terminal for the fifth terminal; if the two are inconsistent, the adaptation layer PDU is discarded; otherwise, if the two are consistent, the adaptation layer PDU will not be discarded. The above method may be referred in the illustration of the foregoing Example 5, and will not be described here.

Based on all of the above embodiments, an information processing method is also provided in the present disclosure, as illustrated in FIG. 8, the method includes the following operations.

At S501, first information transmitted by a sending terminal is received. Herein the first information includes identification information in an adaptation layer PDU. If the first information is received by a first terminal from a relay terminal, operation S502 is performed; if the first information is received by a relay terminal from a network device, operation S503 is performed; if the first information is received by a relay terminal from the first terminal, operation S504 is performed; if the first information is received by a third terminal from the relay terminal, operation S505 is performed; if the first information is received by the relay terminal from a fifth terminal, operation S506 is performed.

At S502, if the identification information satisfies a first condition, the adaptation layer PDU is discarded. Herein, the first condition includes at least one of: a first UE ID in the adaptation layer PDU is not a UE ID configured for the first terminal for the first terminal itself; or a first bearer ID in the adaptation layer PDU is not a bearer ID configured for the first terminal.

At S503, if the identification information satisfies a second condition, the adaptation layer PDU is discarded. Herein, the second condition includes at least one of: the first UE ID in the adaptation layer PDU is not a UE ID configured for the relay terminal for the relay terminal itself; the first UE ID in the adaptation layer PDU is not a UE ID configured for the relay terminal for a related second terminal; the first bearer ID in the adaptation layer PDU is not a bearer ID configured for the relay terminal for the relay terminal itself; or the first bearer ID in the adaptation layer PDU is not a bearer ID configured for the relay terminal for a related second terminal.

At S504, if the identification information satisfies a third condition, the adaptation layer PDU is discarded. Herein, the third condition includes at least one of: the first UE ID in the adaptation layer PDU is not a UE ID configured for the relay terminal for the relay terminal itself; the first UE ID in the adaptation layer PDU is not a UE ID configured for the relay terminal for the first terminal; the first bearer ID in the adaptation layer PDU is not a bearer ID configured for the relay terminal for the relay terminal itself; or the first bearer ID in the adaptation layer PDU is not a bearer ID configured for the relay terminal for the first terminal.

At S505, if the identification information satisfies a fourth condition, the adaptation layer PDU is discarded. Herein the fourth condition includes at least one of: the second UE ID in the adaptation layer PDU is not a UE ID configured for the third terminal for the third terminal itself; the third UE ID in the adaptation layer PDU is not a UE ID configured for the third terminal for a related fourth terminal; or the second bearer ID in the adaptation layer PDU is not a bearer ID configured for the third terminal.

At S506, if the identification information satisfies a fifth condition, the adaptation layer PDU is discarded. Herein the fifth condition includes at least one of: the second UE ID in the adaptation layer PDU is not a UE ID configured for the relay terminal for the relay terminal itself; the second UE ID in the adaptation layer PDU is not a UE ID configured for the relay terminal for the related sixth terminal; the third UE ID in the adaptation layer PDU is not a UE ID configured for the relay terminal for the fifth terminal; the second bearer ID in the adaptation layer PDU is not a bearer ID configured for the relay terminal for the relay terminal itself; the second bearer ID in the adaptation layer PDU is not a bearer ID configured for the relay terminal for the related sixth terminal; or the second bearer ID in the adaptation layer PDU is not a bearer ID configured for the relay terminal for the fifth terminal.

The above-mentioned operations are basically the same as the methods described in the foregoing embodiments, and the detailed contents may refer to the foregoing description and will not be described here.

It should be understood that although illustrated sequentially as indicated by the arrows, the operations in the flowcharts of FIGS. 3-9 are not necessarily performed sequentially as indicated by the arrows. Unless explicitly stated, there are no strict restrictions on the order of these operations, and they can be performed in other orders. Furthermore, at least a portion of the operations in FIGS. 3-8 may include multiple sub-operations or stages, the sub-operations or stages are not necessarily performed at the same moment, but may be performed at different moments. And the order of the sub-operations or stages are also not necessarily performed sequentially, but may be performed in turn or alternately with other operations or at least a portion of the sub-operations or stages of other operations.

The present disclosure provides an information processing method and apparatus, a computer device, and a storage medium. The method includes: first information including first identification information is acquired, and whether to discard data in the first information is determined based on the first identification information and second identification information of a receiving terminal. The method realizes error information processing in combination with first identification information, and the first identification information may be header information in a MAC message. Therefore, the present disclosure provides a new method for processing error information based on MAC header information, and compared with a conventional method for processing error information based on only a LCID, an accuracy of processing error information may be improved, thereby improving continuity and efficiency of receiving data by receiving terminal.

Figure 9:
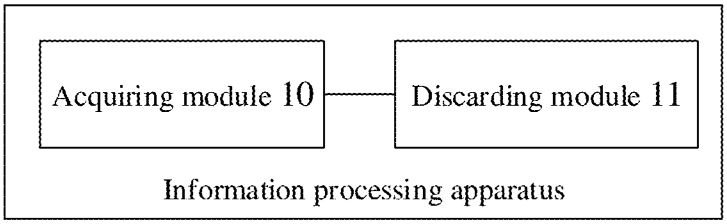
FIG. 9 is a schematic structural diagram of an information processing apparatus provided by an embodiment of the present disclosure.

In an embodiment, as illustrated in FIG. 9, an information processing apparatus is provided. The apparatus includes an acquiring module 10 and a discarding module 11.

The acquiring module 10 is configured to acquire first information of a sending terminal, where the first information includes first address information and a logical channel identifier (LCID).

The discarding module 11 is configured to determine whether to discard data in the first information based on the first address information, the LCID and second address information of a receiving terminal.

Figure 10:
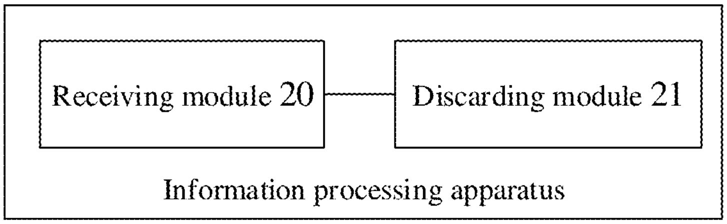
FIG. 10 is a schematic structural diagram of an information processing apparatus provided by an embodiment of the present disclosure.

In an embodiment, as illustrated in FIG. 10, an information processing apparatus is provided. The apparatus includes a receiving module 20 and a discarding module 21.

The receiving module 20 is configured to receive first information transmitted by a sending terminal, where the first information includes identification information in an adaptation layer PDU.

The discarding module 21 is configured to determine whether to discard the adaptation layer PDU based on the identification information.

For the specific limitation of the information processing apparatus, please refer to the limitation of the information processing method described above, and will not be described here. Individual modules in the information processing apparatus may be implemented in whole or in part by software, hardware and combinations thereof. Individual modules may be embedded in or independent of the processor in the computer device in the form of hardware, and may also be stored in the memory in the computer device in the form of software, so as to facilitate the processor to call and execute the operations corresponding to individual modules.

Figure 11:
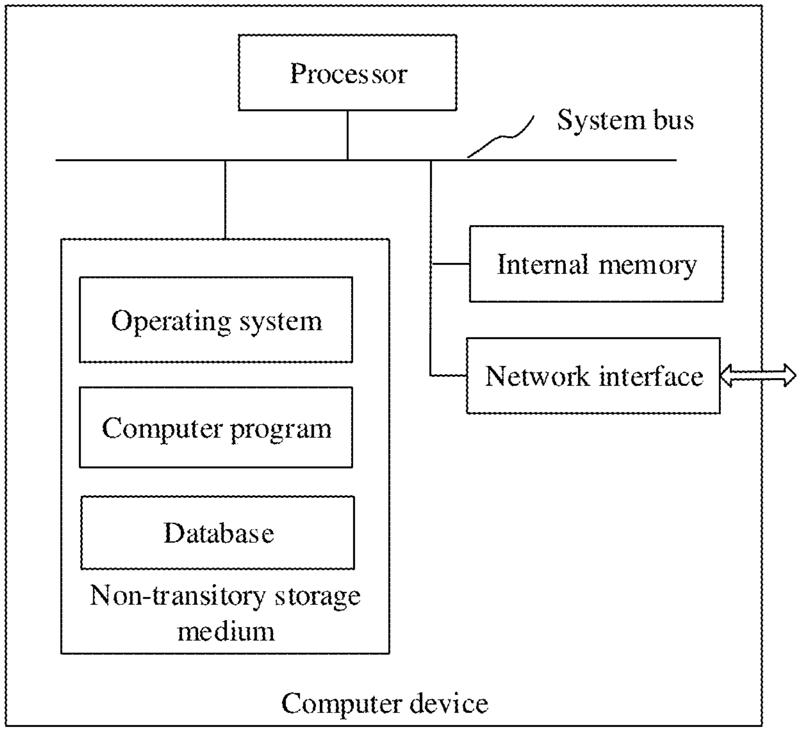
FIG. 11 is an internal structural diagram of a computer device provided by an embodiment of the present disclosure.

In an embodiment, a computer device is provided, which may be a server whose internal structure diagram is illustrated in FIG. 11. The computer device includes a processor, a memory, a network interface, and a database connected through a system bus. Herein, the processor of the computer device is configured to provide computing and control capabilities. The memory of the computer device includes a non-transitory storage medium, an internal memory. The non-transitory storage medium stores an operating system, a computer program, and a database. The internal memory provides an environment for the operation of an operating system and a computer program in a non-transitory storage medium. The database of the computer device is configured to store resource query processing data. The network interface of the computer device is configured to communicate with an external terminal through a network connection. The computer program implements an information processing method when executed by a processor.

Those skilled in the art will appreciate that the structure illustrated in FIG. 11 is only a block diagram of a portion of the configuration relevant to the solution of the present disclosure and does not constitute a limitation on the computer device to which the solution of the present disclosure is applied, and that the particular computer device may include more or fewer components than illustrated in the figure, or may combine certain components, or have different component arrangements.

In an embodiment, a computer device including a memory and a processor is provided, having a computer program stored in the memory that, when executed by the processor, achieves the following operations:

acquiring first information of a sending terminal, where the first information includes first identification information; and determining whether to discard data in the first information based on the first identification information and second identification information of a receiving terminal.

In an embodiment, a computer device including a memory and a processor is provided, having a computer program stored in the memory that, when executed by the processor, achieves the following operations:

receiving first information transmitted by a sending terminal, where the first information includes identification information in an adaptation layer PDU; and determining whether to discard the adaptation layer PDU based on the identification information.

The implementation principle and technical effect of a computer device provided by the above-mentioned embodiment are similar to those of the above-mentioned method embodiment, and will not be described here.

In an embodiment, a computer-readable storage medium is provided, having stored thereon a computer program that, when executed by a processor, achieves the following operations:

acquiring first information of a sending terminal, where the first information includes first identification information; and determining whether to discard data in the first information based on the first identification information and second identification information of a receiving terminal.

In an embodiment, a computer-readable storage medium is provided, having stored thereon a computer program that, when executed by a processor, achieves the following operations:

receiving first information transmitted by a sending terminal, where the first information includes identification information in an adaptation layer PDU; and determining whether to discard the adaptation layer PDU based on the identification information.

The implementation principle and technical effect of a computer-readable storage medium provided by the above-mentioned embodiment are similar to those of the above-mentioned method embodiment, and will not be described here.

Those of ordinary skilled in the art will appreciate that implementing all or part of the flow of the methods of the above-described embodiments may be accomplished by instructing related hardware through a computer program stored in a non-transitory computer readable storage medium, and the computer program, when executed, may include the flow of the embodiments of the above-described methods. Herein, any reference to memory, storage, database or other medium used in various embodiments provided herein may include non-volatile and/or volatile memory. The non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache. By way of illustration but not limitation, RAM is available in various forms, such as Static RAM (SRAM), Dynamic RAM (DRAM), Synchronous DRAM (SDRAM), Dual Data Rate SDRAM (DDRSDRAM), Enhanced SDRAM (ESDRAM), Synchlink DRAM (SL-DRAM), Rambus Direct RAM (RDRAM), Direct Rambus Dynamic RAM (DRDRAM), and Rambus Dynamic RAM (RDRAM).

The technical features of the above embodiments may be combined arbitrarily, and all possible combinations of the technical features in the above embodiments have not been described in order to make the description concise. However, as long as there is no contradiction in the combinations of these technical features, they should be considered to be within the scope of the Description. The above-described embodiments merely illustrate several embodiments of the present disclosure, the description thereof is specific and detailed but cannot therefore be construed as limiting the scope of the disclosure. It should be noted that a number of variants and modifications may be made for those of ordinary skilled in the art without departing from the concept of the present disclosure, which fall within the scope of the present disclosure. Therefore, the scope of the present application shall be subject to the attached claims.

The invention claimed is:

1. A method for information processing, comprising:

receiving first information transmitted by a sending terminal, wherein the first information includes identification information in an adaptation layer protocol data unit (PDU); and determining whether to discard the adaptation layer PDU based on the identification information;

wherein the identification information comprises at least one of a first user equipment (UE) identifier (ID) or a first bearer ID in the adaptation layer PDU; and wherein when the first information is received by a first terminal from a relay terminal, determining whether to discard the adaptation layer PDU based on the identification information comprises: discarding the adaptation layer PDU when the identification information satisfies a first condition, wherein the first condition comprises at least one of the following:

the first UE ID in the adaptation layer PDU is not a UE ID configured for the first terminal; or the first bearer ID in the adaptation layer PDU is not a bearer ID configured for the first terminal.

2. The method of claim 1, wherein, when the first information is received by the relay terminal from a network device, determining whether to discard the adaptation layer PDU based on the identification information comprises:

discarding the adaptation layer PDU when the identification information satisfies a second condition, wherein the second condition comprises at least one of the following:

the first UE ID in the adaptation layer PDU is not a UE ID configured in the relay terminal for a related second terminal; or the first bearer ID in the adaptation layer PDU is not a bearer ID configured in the relay terminal for the related second terminal.

3. The method of claim 1, wherein, when the first information is received by the relay terminal from the first terminal, determining whether to discard the adaptation layer PDU based on the identification information comprises:

discarding the adaptation layer PDU when the identification information satisfies a third condition, wherein the third condition comprises:

the first UE ID in the adaptation layer PDU is not a UE ID configured in the relay terminal for the first terminal.

4. A computer device, comprising:

a processor;

a memory; and a transceiver, wherein the processor, the memory and the transceiver communicates with each other via an internal connection path;

wherein the memory is configured to store program codes; and wherein the processor is configured to call the program codes stored in the memory to cooperate with the transceiver to:

receive first information transmitted by a sending terminal, wherein the first information includes identification information in an adaptation layer protocol data unit (PDU); and determine whether to discard the adaptation layer PDU based on the identification information;

wherein the identification information comprises at least one of a first user equipment (UE) identifier (ID) or a first bearer ID in the adaptation layer PDU; and wherein when the first information is received by a first terminal from a relay terminal, the processor is specifically configured to discard the adaptation layer PDU when the identification information satisfies a first condition, wherein the first condition comprises at least one of the following:

the first UE ID in the adaptation layer PDU is not a UE ID configured for the first terminal; or the first bearer ID in the adaptation layer PDU is not a bearer ID configured for the first terminal.

5. The computer device of claim 4, wherein, when the first information is received by the relay terminal from a network device, the processor is specifically configured to discard the adaptation layer PDU when the identification information satisfies a second condition, wherein the second condition comprises at least one of the following:

the first UE ID in the adaptation layer PDU is not a UE ID configured in the relay terminal for a related second terminal; or the first bearer ID in the adaptation layer PDU is not a bearer ID configured in the relay terminal for the related second terminal.

6. The computer device of claim 4, wherein, when the first information is received by the relay terminal from the first terminal, the processor is specifically configured to discard the adaptation layer PDU when the identification information satisfies a third condition, wherein the third condition comprises:

the first UE ID in the adaptation layer PDU is not a UE ID configured in the relay terminal for the first terminal.

7. A computer device, comprising:

a processor;

a memory; and a transceiver, wherein the processor, the memory and the transceiver communicates with each other via an internal connection path;

wherein the memory is configured to store program codes; and wherein the processor is configured to call the program codes stored in the memory to cooperate with the transceiver to:

send first information to a receiving terminal, wherein the first information comprises identification information in an adaptation layer protocol data unit (PDU), the identification information being used for the receiving terminal to determine whether to discard the adaptation layer PDU;

wherein the identification information comprises at least one of a first user equipment (UE) identifier (ID) or a first bearer ID in the adaptation layer PDU; and wherein when the first information is sent by a relay terminal to a first terminal, the identification information is configured to cause the first terminal to discard the adaptation layer PDU when the identification information satisfies a first condition, wherein the first condition comprises at least one of the following:

the first UE ID in the adaptation layer PDU is not a UE ID configured for the first terminal; or the first bearer ID in the adaptation layer PDU is not a bearer ID configured for the first terminal.

8. The computer device of claim 7, wherein when the first information is sent by a network device to the relay terminal, the identification information is configured to cause the relay terminal to discard the adaptation layer PDU when the identification information satisfies a second condition, wherein the second condition comprises at least one of the following:

the first UE ID in the adaptation layer PDU is not a UE ID configured in the relay terminal for a related second terminal; or the first bearer ID in the adaptation layer PDU is not a bearer ID configured in the relay terminal for the related second terminal.

9. The computer device of claim 7, wherein when the first information is sent by the first terminal to the relay terminal, the identification information is configured to cause the relay terminal to discard the adaptation layer PDU when the identification information satisfies a third condition, wherein the third condition comprises:

the first UE ID in the adaptation layer PDU is not a UE ID configured in the relay terminal for the first terminal.

* * * * *